US 8,755,435 B2

(12) United States Patent
Guo et al.

(10) Patent No.: US 8,755,435 B2
(45) Date of Patent: Jun. 17, 2014

(54) METHOD AND APPARATUS OF IMPROVED INTRA PREDICTION MODE CODING

(75) Inventors: Mei Guo, Harbin (CN); Xun Guo, Beijing (CN); Shaw-Min Lei, Hsin-chu (TW)

(73) Assignee: Mediatek Inc., Hsinchu (TW)

( * ) Notice: Subject to any disclaimer, the term of this patent is extended or adjusted under 35 U.S.C. 154(b) by 345 days.

(21) Appl. No.: 13/171,858

(22) Filed: Jun. 29, 2011

(65) Prior Publication Data

US 2012/0177112 A1    Jul. 12, 2012

Related U.S. Application Data

(60) Provisional application No. 61/430,701, filed on Jan. 7, 2011, provisional application No. 61/437,910, filed on Jan. 31, 2011.

(30) Foreign Application Priority Data

Jun. 28, 2011  (WO) ................ PCT/CN2011/076498

(51) Int. Cl.
*H04N 7/12* (2006.01)
(52) U.S. Cl.
USPC .................................... 375/240.12
(58) Field of Classification Search
USPC ........................ 375/240.01, 240.12
See application file for complete search history.

(56) References Cited

U.S. PATENT DOCUMENTS

2005/0013375 A1*  1/2005  Dattani et al. ........... 375/240.24
2006/0109911 A1*  5/2006  Jang et al. ................ 375/240.18

(Continued)

FOREIGN PATENT DOCUMENTS

JP    2007-150913 A    6/2007

JP    P2007-150913 A    6/2007

(Continued)

OTHER PUBLICATIONS

Wiegand,T.,et al, WD1: Working Draft 1 of High-Efficiency Video Coding, Joint Collaborative Team on Video Coding (JCT-VC)of ITU-T SG16 WP3 and ISO/IEC JTC1/SC29/WG11 JCTVC-C403 Oct. 7, 2010,p. 67-75.

(Continued)

*Primary Examiner* — Dave Czekaj
*Assistant Examiner* — Tracy Li
(74) *Attorney, Agent, or Firm* — Blairtech Solution LLC

(57) ABSTRACT

A method and apparatus for improved intra chroma prediction mode coding are disclosed. Intra prediction exploits the spatial correlation within a picture or within a picture region. In practice, a picture is divided into blocks and the intra mode prediction is performed on a block basis. In newer coding systems, multiple intra coding modes such as Vertical mode, Horizontal mode, DC mode and Diagonal mode, have been used to improve the coding efficiency of intra coding. Furthermore, a Luma_mode has also been used in intra prediction of chroma component to further improve the performance in the High Efficiency Video Coding (HEVC) standard being developed. However, the mode selection information for intra prediction has to be conveyed to the decoder for proper operation. Spatial features in a picture often exist in both luma and chroma components. The intra luma prediction mode and intra chroma prediction mode will have high probability to be the same. Accordingly, an embodiment according to the present invention adaptively assigns variable length codes to a set of mode symbols associated with intra chroma prediction by assigning a shortest code to the Luma_mode. Luma_mode not only can be the best luma mode of the corresponding luma block but also can be selected from several corresponding luma modes. The maximum length of chroma prediction codes is decreased by one bit when Luma_mode is equal to one of frequent modes. The coding efficiency of arithmetic coding of chroma prediction codes is further improved by selecting the context upon neighboring blocks.

32 Claims, 5 Drawing Sheets

(56) References Cited

U.S. PATENT DOCUMENTS

| | | | |
|---|---|---|---|
| 2009/0175334 A1* | 7/2009 | Ye et al. | 375/240.12 |
| 2010/0040148 A1* | 2/2010 | Marpe et al. | 375/240.16 |
| 2011/0292999 A1* | 12/2011 | Jeong et al. | 375/240.12 |

FOREIGN PATENT DOCUMENTS

| | | |
|---|---|---|
| JP | 2009-516417 A | 4/2009 |
| JP | P2009-516417 A | 4/2009 |
| JP | 2009-177787 A | 8/2009 |
| JP | P2009-177787 A | 8/2009 |
| JP | 2010-177809 A | 8/2010 |
| JP | P2010-177809 A | 8/2010 |
| WO | 2007/055552 A1 | 5/2007 |
| WO | 2007055552 A1 | 5/2007 |
| WO | 2012/008125 A1 | 1/2012 |
| WO | 2012008125 A1 | 1/2012 |

OTHER PUBLICATIONS

Wiegand, T.,et al, WD1: Working Draft 1 of High-Efficiency Video Coding,Joint Collaborative Team on Video Coding (JCT-VC)of ITU-T SG16 WP3 and ISO/IEC JTC1/SC29/WG11 JCTVC-C403, Oct. 7, 2010, p. 67-75, URL http://wftp3.itu.int/av-arch/jctvc-site/2010_10_C_Guangzhou/JCTVCC403.zip.

Japan PTO Office Action on the corresponding application, mailing date: Jan. 21, 2014

* cited by examiner

METHOD AND APPARATUS OF IMPROVED INTRA PREDICTION MODE CODING

CROSS REFERENCE TO RELATED APPLICATIONS

The present invention claims priority to U.S. Provisional Patent Application Ser. No. 61/430,701, filed Jan. 7, 2011, entitled "Improved Intra Prediction Mode Coding Method", U.S. Provisional Patent Application Ser. No. 61/437,910, filed Jan. 31, 2011, entitled "Improved Intra Prediction Mode Coding Method" and PCT Patent Application, Serial No. PCT/CN2011/076498, filed Jun. 28, 2011, entitled "Method and Apparatus of Improved Intra Prediction Mode Coding". The U.S. Provisional Patent Applications and PCT Patent Application are hereby incorporated by reference in their entireties.

FIELD OF THE INVENTION

The present invention relates to video coding. In particular, the present invention relates to coding techniques associated with the intra chroma prediction mode.

BACKGROUND

Motion compensated inter-frame coding has been widely adopted in various coding standards, such as MPEG-1/2/4 and H.261/H.263/H.264/AVC. While motion-compensated inter-frame coding can effectively reduce bitrate for compressed video, intra mode coding is still required to process an initial picture or to periodically insert I-pictures or I-blocks for random access or for alleviation of error propagation. Intra prediction exploits the spatial correlation within a picture or within a picture region. In practice, a picture or a picture region is divided into blocks and the intra prediction is performed on a block basis. Intra prediction for a current block can be relied upon pixels in neighboring blocks that have been processed. For example, if blocks in a picture or picture region are processed row by row from top to bottom and from left to right, neighboring blocks on the top and neighboring blocks on the left of the current block can be used to form intra predictor for pixels in the current block. While any pixels in the processed neighboring blocks can be used for intra predictor of pixels in the current block, very often only pixels of the neighboring blocks that are adjacent to the current block boundaries on the top and on the left are used. Furthermore, the intra predictor is usually designed to exploit spatial features in the picture such as smooth area (DC mode), vertical line or edge, horizontal line or edge and diagonal line or edge. Furthermore, a spatial feature often exists in both luma and chroma components. Therefore, the intra luma prediction mode can be used as a candidate for the intra chroma prediction mode. A respective intra predictor can be designed to exploit each feature accordingly.

As mentioned before, there are multiple intra prediction modes for intra mode coding. For each block, information associated with the selected intra prediction mode has to be conveyed to the decoder side so that a corresponding intra predictor can be applied to recover the intra-coded picture or picture region. When the block size is small, the side information associated with the intra prediction mode may be substantial. For chroma components of video data, the block size is usually smaller than the luma component. Therefore, the coding efficiency of intra prediction mode for the chroma components becomes more critical. Variable length codes have been used to code the intra chroma prediction mode in H.264/AVC standard and the High-Efficiency Video Coding (HEVC) standard being developed. Nevertheless, it is desirable to further improve the coding efficiency of the intra chroma prediction mode.

BRIEF SUMMARY OF THE INVENTION

A method and apparatus for coding intra chroma prediction mode of a chroma block are disclosed. In one embodiment according to the present invention, the method and apparatus for coding intra chroma prediction mode of a chroma block comprise steps of receiving a set of chroma mode symbols associated with the intra chroma prediction mode of the chroma block, determining variable length codes for the set of chroma mode symbols, receiving a current intra chroma prediction mode for a current chroma block, and determining a code for the current intra chroma prediction mode of the current chroma block according to the variable length codes. The set of chroma mode symbols includes one entry associated with Luma_mode to allow the chroma block to use an intra luma prediction mode of a corresponding luma block as the intra chroma prediction mode and a shortest length code is assigned to the Luma_mode. When only one corresponding luma block is available, Luma_mode is equal to the best luma mode of that; otherwise, Luma_mode is selected from all luma modes of the corresponding luma blocks. In another embodiment of the present invention, determination of the chroma prediction code is related to the intra luma prediction mode of the corresponding luma block. The set of chroma mode names includes a plurality of frequent modes. When the intra luma prediction mode of the corresponding luma block (namely Luma_mode) is equal to one of the plurality of frequent modes, the variable length codes are modified to reduce a total number of the variable length codes by one and the maximum length of variable length codes is decreased by one bit accordingly. The plurality of frequent modes may include a DC mode, a Vertical mode, a Horizontal mode and a Diagonal mode or other possible intra prediction modes. In yet another embodiment according to the present invention, the method further comprises a step of receiving context associated with at least one neighboring chroma block of the current chroma block, and determining the context associated with the first bit of each chroma prediction code in arithmetic coding. Variations of context formation are disclosed to practice the present invention.

A method and apparatus for decoding intra chroma prediction mode of a chroma block are disclosed. In one embodiment according to the present invention, the method and apparatus for decoding intra chroma prediction mode of a chroma block comprise steps of receiving variable length codes for a set of chroma mode symbols associated with the intra chroma prediction mode of the chroma block, receiving data from a compressed bitstream wherein the compressed bitstream comprises a chroma prediction code corresponding to a current intra chroma prediction mode of a current chroma block, and determining the current intra chroma prediction mode of the current chroma block according to the code of the chroma prediction mode and the variable length codes. The set of chroma mode names includes one entry associated with Luma_mode to allow the chroma block to use an intra luma prediction mode of a corresponding luma block as the intra chroma prediction mode, and a shortest length code is assigned to the Luma_mode. When only one corresponding luma block is available, Luma_mode is equal to the best luma mode of that; otherwise, Luma_mode is selected from all luma modes of the corresponding luma blocks. In another embodiment according to the present invention, the set of chroma mode names includes a plurality of frequent modes, and the variable length codes are modified to reduce a total number of the variable length codes by one and the maximum length of variable length codes is decreased by one bit accordingly if the intra luma prediction mode of the corresponding luma block (namely Luma_mode) is equal to one element of the plurality of frequent modes. The plurality of frequent modes may include a DC mode, a Vertical mode, a Horizontal mode and a Diagonal mode or other possible intra prediction modes. In yet another embodiment according to the present invention, the method further comprises a step of receiving context associated with at least one neighboring chroma block of the current chroma block, and determining the context associated with the first bit of each chroma prediction code in arithmetic coding. Variations of context formation are disclosed to practice the present invention.

DETAILED DESCRIPTION OF THE INVENTION

Figure 1:
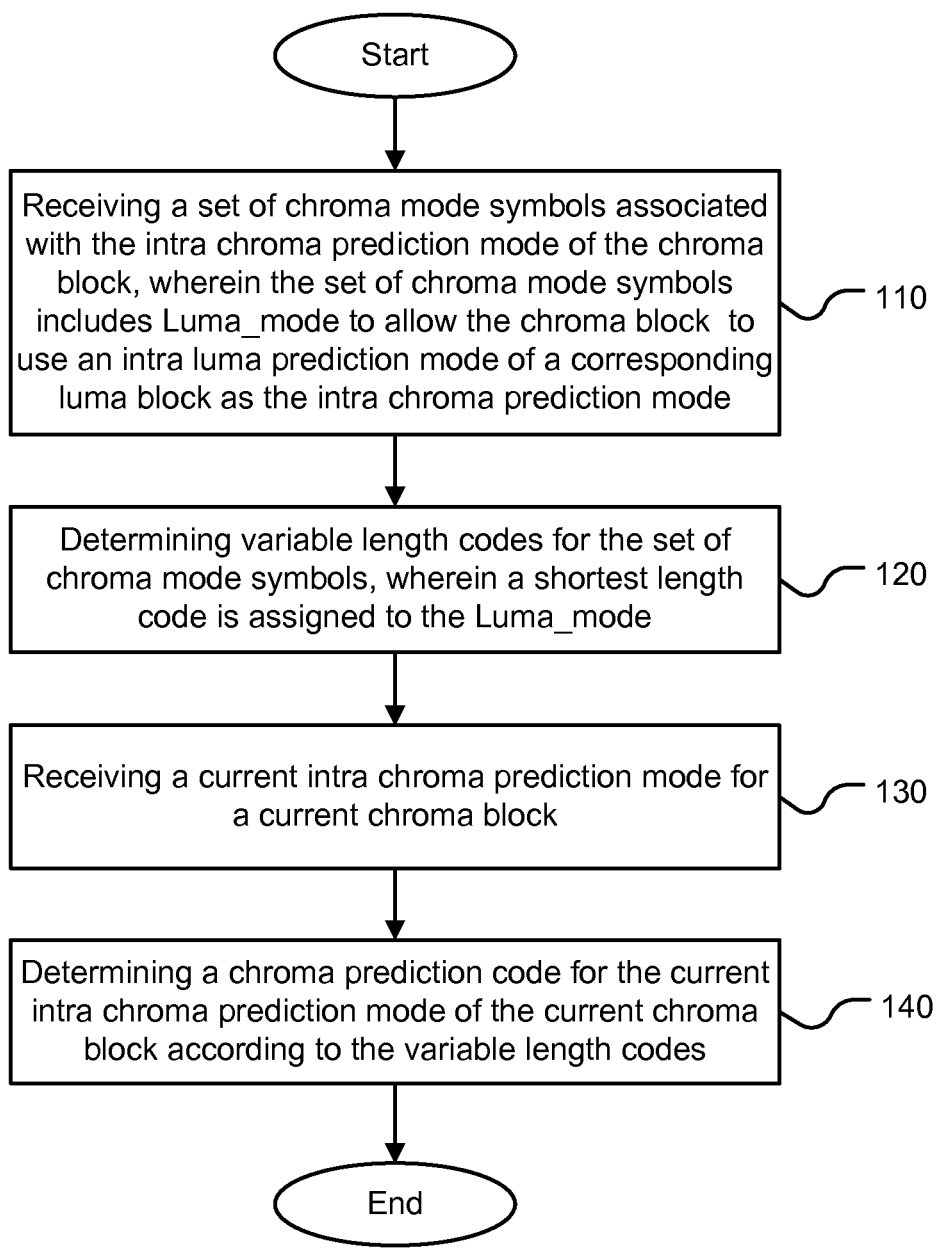
FIG. 1 illustrates an exemplary flow chart of coding intra chroma prediction mode of a chroma block according to the present invention.

The intra-mode coding in H.264/AVC and the High-Efficiency Video Coding (HEVC) standard being developed is more advanced than the older standards such as MPEG-1/2/4. The intra mode coding in H.264/AVC and HEVC performs prediction in the spatial domain based on neighboring processed blocks. For the luma component in the H.264/AVC, three types of partitions, i.e., Intra 4×4, Intra 8×8 and Intra 16×16 are allowed. For chroma components, the intra prediction size is fixed to be 8×8. For each block size, multiple prediction modes are allowed. For example, there are 9 modes for the 4×4 luma blocks corresponding to Vertical prediction, Horizontal prediction, DC prediction, and six off-axis predictions. Each 8×8 chroma component of a macroblock is predicted from chroma samples above and/or chroma samples to the left that have previously been encoded and reconstructed. There are 4 intra chroma prediction modes for H.264/AVC: DC (mode 0), Horizontal (mode 1), Vertical (mode 2) and Plane (mode 3). The use of multiple prediction modes can improve the quality of intra prediction by resulting in smaller residues. However, the information related to intra prediction modes has to be transmitted along with the residues so that the blocks can be properly reconstructed at the decoder side.

The HEVC standard under development adopts a new unit for inter/intra prediction, called Prediction Unit (PU), where the PU is hierarchically partitioned starting from a maximum block size. In HEVC, an additional intra prediction mode, i.e., Luma_mode is allowed for intra chroma prediction. Therefore, in current version of HEVC, there are 5 intra prediction modes (Vertical, Horizontal, DC, Diagonal and Luma_mode) for the chroma block in HEVC. Variable length codes for the set of 5 luma prediction modes (Vertical, Horizontal, DC, Diagonal and Luma_mode) according to one existing HEVC design is shown in Table 1.

TABLE 1

| Chroma Mode Symbol | Chroma Prediction Mode Name | Codeword |
|---|---|---|
| 0 | Vertical | 0 |
| 1 | Horizontal | 10 |
| 2 | DC | 110 |
| 3 | Diagonal | 1110 |
| 4 | Luma_mode | 1111 |

As shown in the above table, the existing HEVC design assigns shorter codewords (1, 2 and 3 bits) to the Vertical, Horizontal and DC chroma prediction modes. The term, "code" may also be used to refer to "codeword" for convenience in this disclosure. Since the same spatial feature in the picture or picture region will likely exist in both luma and chroma components, if the corresponding luma block has been encoded, the intra luma prediction mode for the luma block is a good candidate for the intra chroma prediction mode for the chroma block. There is a high probability that the intra chroma prediction mode and the intra luma prediction mode of a PU are the same. The variable length codes shown in the above table may not result in the best coding efficiency.

In order to improve the coding efficiency associated with intra chroma prediction mode, an embodiment according to the present invention adaptively assigns a shortest code to the Luma_mode. Accordingly, when coding the chroma block of current PU, the intra mode of luma component (intra_luma_pred_mode) is considered as the most probable mode and is assigned with the shortest codeword. While there are 5 possible modes for intra chroma prediction in the above example, there may be a larger number of modes for intra luma prediction. The indices for additional intra luma modes are mapped into a mode symbol. For example, a total of 34 intra luma prediction modes are being considered in HEVC for 16×16 luma block. Mode symbols "0", "1", "2" and "3" may be used to designate Vertical, Horizontal, DC and Diagonal modes respectively for intra luma prediction and the remaining intra luma prediction modes can be mapped to mode symbol "4". While only 5 intra chroma prediction mode symbols are used in the above example, i.e., "0", "1", "2", "3", and "4", the use of Luma_mode may expand the possible mode choice for the chroma block. For example, if intra luma prediction mode, denoted as intra_luma_pred_mode, is 22 and the intra chroma prediction mode selects Luma_mode, this implies that the chroma block is intra coded according to intra luma mode 22 as well. The intra predictor corresponding to intra luma mode 22 for chroma block may be derived accordingly. Therefore, the actual intra chroma mode symbol (e.g., "22" in the above mentioned example) associated with Luma_mode is implicit in Table 1 because the actual intra chroma mode symbol is determined by intra_luma_pred_mode. The intra chroma prediction modes explicitly listed in Table 1, i.e. Vertical, Horizontal, DC and Diagonal modes usually are modes that may occur more frequently. The explicit modes in Table 1 are named as frequent modes for easy reference. Of course other intra prediction modes may also be the frequent modes in practice.

When one current chroma block corresponds to only one luma block within the same PU, the intra_luma_pred_mode of that luma block or the mapping index of intra_luma_pred- _mode with the above exemplary mapping method is directly used as Luma_mode. Otherwise, due to the PU partition, if one current chroma block has more than one corresponding luma blocks, Luma_mode is selected from all available intra_luma_pred_modes of the corresponding luma blocks. For example, Luma_mode takes the intra_luma_pred_mode with the minimum mode index.

With the above exemplary mapping, when the index of Luma_mode is equal to one of frequent modes involved in the mode decision process of chroma component, which means Luma_mode is less than 4 in the example of Table 1, there are actually only 4 candidate chroma prediction modes. For example, in the case of Luma_mode equal to "1", if the intra chroma prediction mode is also "1", this implies the intra chroma prediction mode is the same as the intra luma prediction mode. Thus, intra chroma prediction mode "4"-Luma_mode is used instead and the original chroma prediction mode "1" is made as a non-valid mode symbol. The variable length codes associated with 4 mode symbols can be modified to shorten the maximum length of codewords. It is noted that symbols "1110" and "1111" are two codewords having largest length in a coding tree. When one of those two nodes in the coding tree is eliminated, the other codeword can be shortened by removing the last bit. Therefore, the codewords with maximum length are "111" and "110". When Luma_mode is not the same as either of frequent chroma prediction modes which means the index of the corresponding intra_luma_pred_mode is equal to or larger than 4 in the example of Table 1, Luma_mode appears as an additional candidate mode corresponding to the mode symbol "4" and all frequent modes "0", "1", "2" and "3" are all valid.

TABLE 2

| intra_chroma_pred_mode | Table I | Table II | Table III | ... |
|---|---|---|---|---|
| Luma_mode | 0 | 0 | 0 | ... |
| frequent modes | 10 | 10 | 10 | ... |
|  | 111 | 110 | 110 | ... |
|  | 110 | 1111 | 1110 | ... |
|  | n/a | 1110 | 11111 | ... |
|  | n/a | n/a | 11110 | ... |
|  | n/a | n/a | n/a | ... |
|  | ... | ... | ... |  |
|  | n/a | n/a | n/a |  |

The coding table proposed in the present invention is given in Table 2. When Luma_mode is equal to one of frequent modes and there are four candidate chroma prediction modes as exemplified above, Table I having four chroma prediction codes is used. When Luma_mode is not equal to either of frequent modes and five candidate chroma prediction modes are available, Table II with five codes is used. When the number of candidate chroma prediction modes is increased, the coding table can be extended accordingly. An example of coding table with six codes is illustrated as Table III in Table 2. It is noted that the coding table has three key features. First, the shortest codeword "0" is always assigned to Luma_mode. Second, two codewords having the maximum length that is equal to the number of codes minus 1. Third, as for the two codewords having maximum length, the one with last bit "1" is ranked before the one with last bit "0". For example, the code "111" has higher ranking than the code "110".

An exemplary method to practice the present invention at an encoder side is illustrated in FIG. 1. The process starts with receiving a set of chroma mode symbols associated with the intra chroma prediction mode of the chroma block as shown in block 110 of FIG. 1, wherein the set of chroma mode symbols includes one entry associated with Luma_mode to allow the chroma block to use an intra luma prediction mode of a corresponding luma block or an selected intra luma prediction mode of several corresponding luma blocks as the intra chroma prediction mode. In the example mentioned earlier, the set of chroma mode symbols consists of "0", "1", "2", "3" and "4" associated with possible intra chroma prediction modes "Vertical", "Horizontal", "DC", "Diagonal" and "Luma_mode" respectively. In step 120, variable length codes are generated for the set of chroma mode symbols by assigning a shortest length code to the Luma_mode. Other variable length codes are assigned to the remaining entries of the set of chroma mode symbols. There are several well known methods in the field for generating the variable length codes such as Exp-Golomb codes or Huffman codes. Any of the variable length code generation methods can be used to practice the present invention by assigning the shortest code to the Luma_mode. When the variable length codes are determined, the process is ready to code the chroma prediction mode. A current intra chroma prediction mode for a current chroma block is received as shown in step 130. The current intra chroma prediction mode may be determined according to a performance criterion such as minimum mean squared error or RD (Rate-Distortion) optimization. The determination of the current intra chroma prediction mode may be performed in a processing unit of the encoder system. Nevertheless, the determination of the current intra chroma prediction mode may also be performed in an embodiment to practice the present invention. The process then determines the chroma prediction code for the current intra chroma prediction mode of the current chroma block according to the variable length codes as shown in step 140.

The variable length codes can be adaptively assigned to the set of intra chroma prediction mode symbols according to the intra luma prediction mode of the corresponding luma block. An exemplary adaptive variable length codes embodying the present invention are shown in Table 3, where intra_chroma_pred_mode denotes the intra chroma prediction mode and intra_luma_pred_mode denotes the intra luma prediction mode. A shortest codeword, i.e., "0" is always assigned to the intra chroma prediction mode that is the same as the intra luma prediction mode. When intra_luma_pred_mode="0", "1", "2" or "3", the intra_chroma_pred_mode equaling to intra_luma_pred_mode is set to be non-valid and Luma_mode "4" is used instead.

TABLE 3

|  | intra_luma_pred_mode |  |  |  |  |
|---|---|---|---|---|---|
| intra_chroma_pred_mode | 0 | 1 | 2 | 3 | Others (4 ... 33) |
| 0 | n/a | 10 | 10 | 10 | 10 |
| 1 | 10 | n/a | 111 | 111 | 110 |
| 2 | 111 | 111 | n/a | 110 | 1111 |
| 3 | 110 | 110 | 110 | n/a | 1110 |
| 4 (same as intra_luma_pred_mode) | 0 | 0 | 0 | 0 | 0 |

While the shortest codeword is assigned to the intra chroma prediction mode that is the same as the intra luma prediction mode, other variable length codes are assigned to the remaining intra chroma prediction modes where a shorter codeword is assigned to a smaller index of chroma prediction mode. The adaptive codeword assignment is shown in Table 3 for illustration purpose and should not be construed as limitations to the present invention. intra_luma_pred_mode or intra_chroma_pred_mode may contain more or less entries and different variable length codes may be used to practice the present invention.

Figure 2:
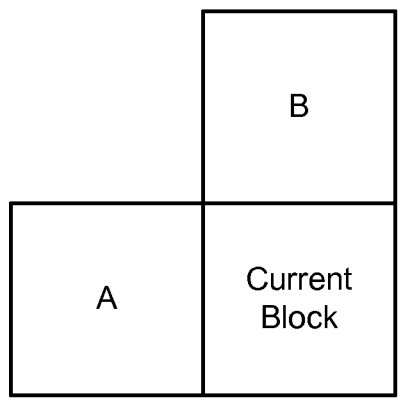
FIG. 2 illustrates an example to form context based on two neighboring blocks.
Figure 3:
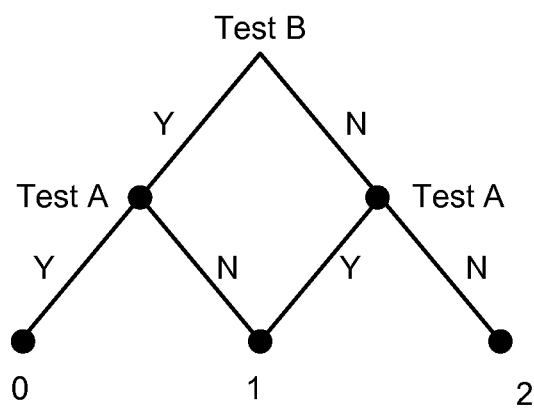
FIG. 3 illustrates an example to form a decision tree to select the context.

In the arithmetic coding of the assigned codewords with the present invention, the context of the first bit of the codewords is based on information of neighboring blocks that is available to the current block. For example, information from the block to the top of the current block and the block on the left of the current block may be used for the context. The information associated with the neighboring block may be the intra prediction mode or other characteristics that may affect the statistics of the intra chroma prediction mode for the current chroma block. A decision tree can be used to select the context. In one example, the neighboring blocks consists of 2 blocks, where block A is on the left of the current block and block B is on the top of the current block as shown in FIG. 2. While two neighboring blocks are used in the example, fewer or more neighboring blocks may be used. Furthermore, the neighboring blocks may be located other than the immediate left side and the immediate top side of the current block. One example to form a decision tree associated with the context in FIG. 2 is shown in FIG. 3. The intra chroma prediction mode, ModeA(C) and intra luma prediction mode, ModeA(L) of block A are compared. Also, the intra chroma prediction mode, ModeB(C) and intra luma prediction mode, ModeB(L) of block B are compared. A decision tree according to the above tests can be formed which results in three selection nodes, 0 through 2 as shown in FIG. 3.

Figure 4:
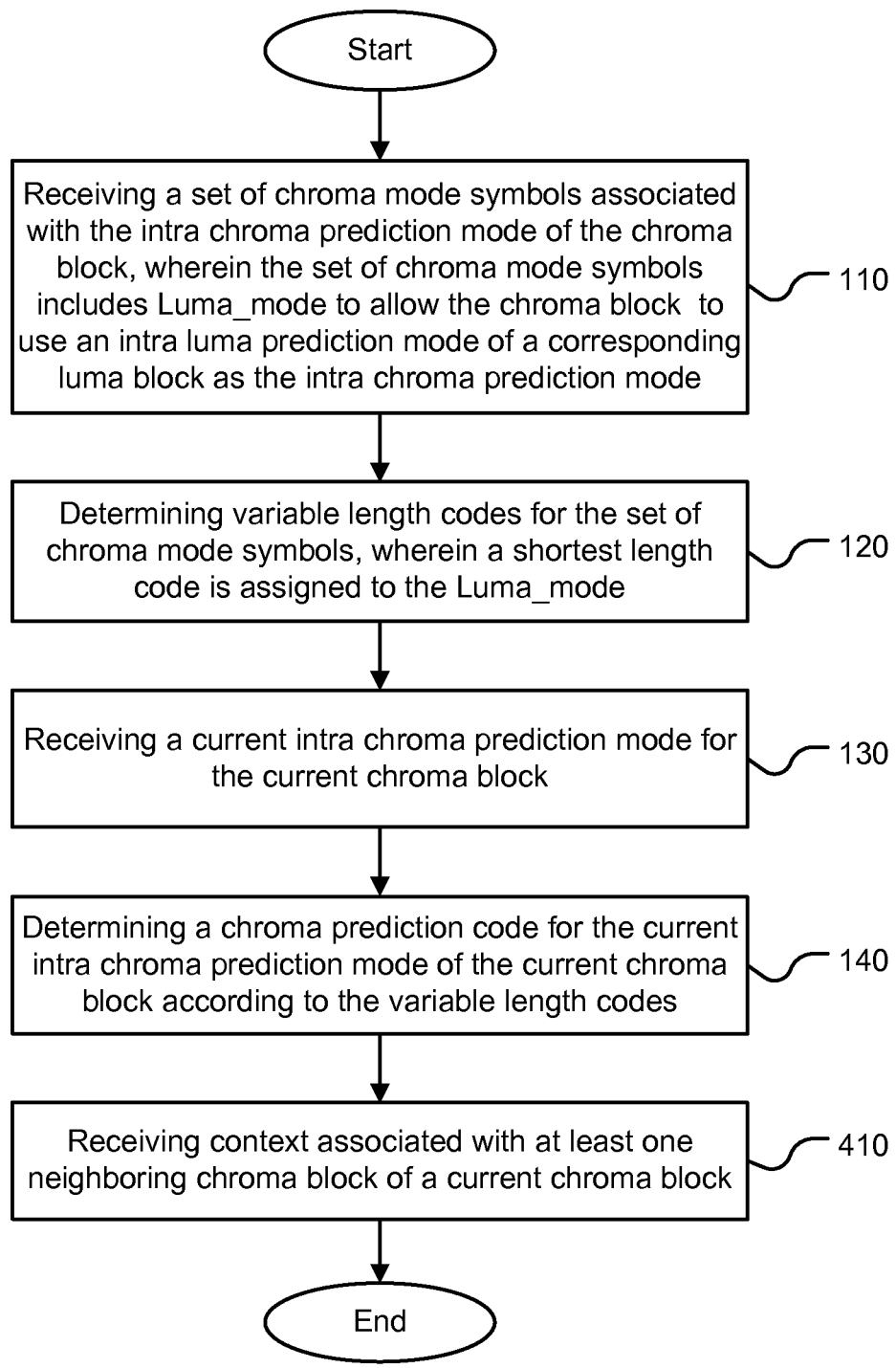
FIG. 4 illustrates an exemplary flow chart for the selection of context in arithmetic encoding of chroma prediction codes of a chroma block according to the present invention.

An exemplary method to practice the selection of context in arithmetic coding of chroma prediction codes at an encoder side is illustrated in FIG. 4, which is similar to FIG. 1. However, the process includes an additional step 410 to receive context associated with at least one neighboring chroma block of a current chroma block. The context is used in the arithmetic encoding of the first bit of the chroma prediction codes.

Figure 5:
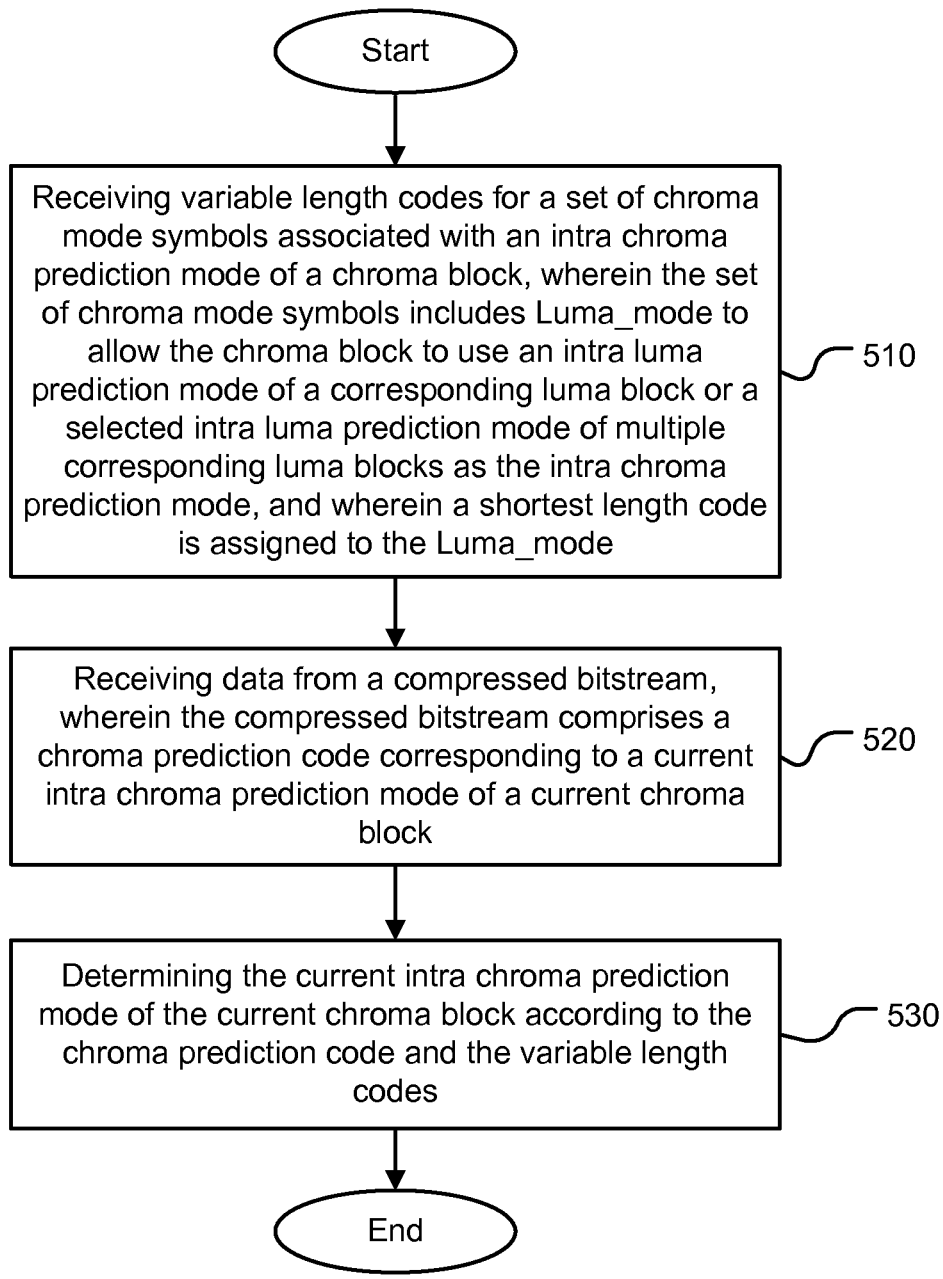
FIG. 5 illustrates an exemplary flow chart of decoding intra chroma prediction mode of a chroma block according to the present invention.

An exemplary method to practice the improved intra chroma prediction mode coding according to the present invention at a decoder side is illustrated in FIG. 5. The process starts with receiving variable length codes for a set of chroma mode symbols associated with an intra chroma prediction mode of a chroma block as shown in step 510. The set of chroma mode symbols includes Luma_mode to allow the chroma block to use an intra luma prediction mode of a corresponding luma block or an selected intra luma prediction mode of several corresponding luma blocks as the intra chroma prediction mode, and a shortest length code is assigned to the Luma_mode. In step 520, data from a compressed bitstream is received, wherein the compressed bitstream comprises a chroma prediction code corresponding to a current intra chroma prediction mode of a current chroma block. The process then determines the current intra chroma prediction mode of the current chroma block according to the chroma prediction code and the variable length codes.

Figure 6:
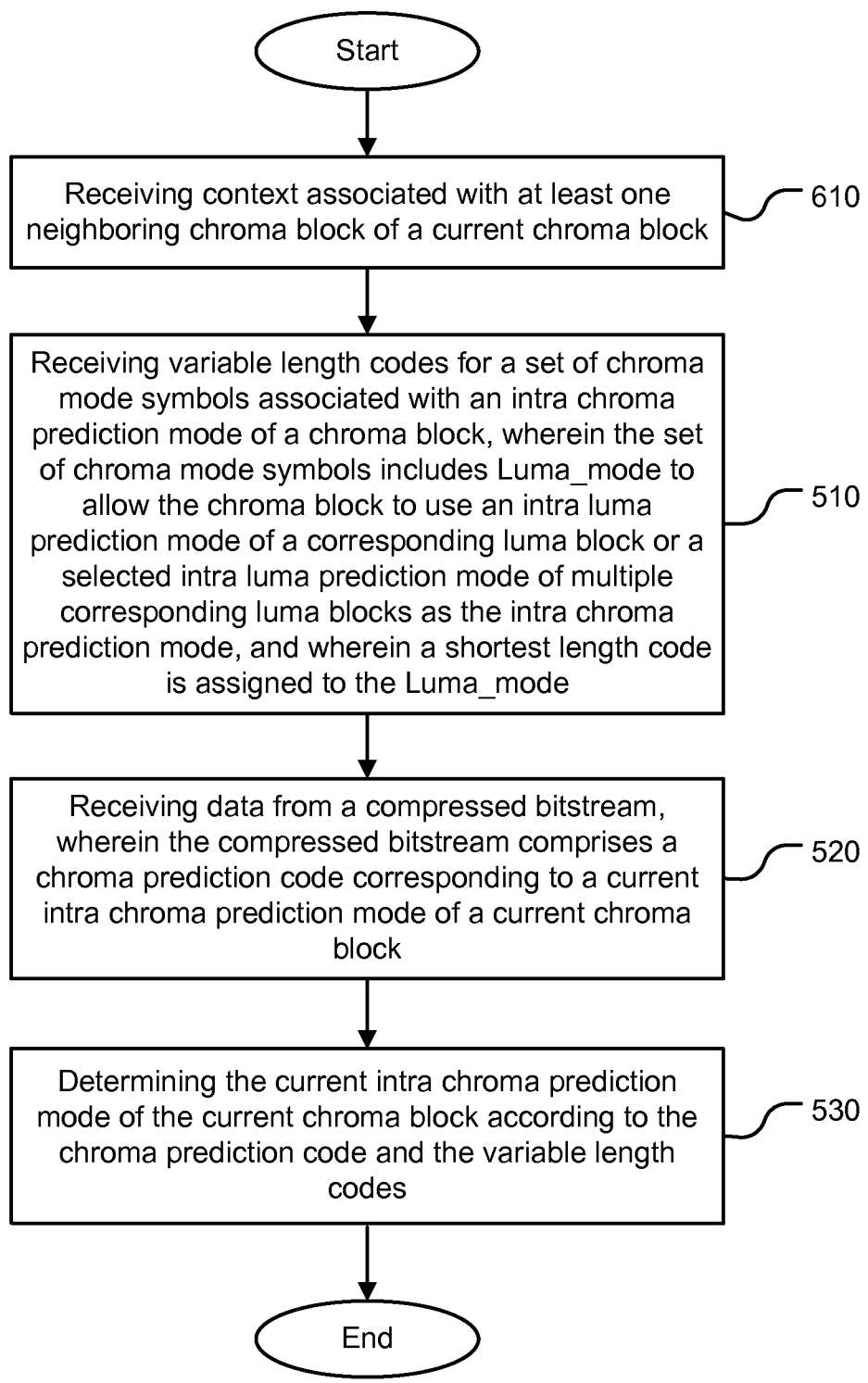
FIG. 6 illustrates an exemplary flow chart for the selection of context in arithmetic decoding of chroma prediction codes of a chroma block according to the present invention.

An exemplary method to practice the selection of the context in arithmetic coding of the chroma prediction codes at a decoder side is illustrated in FIG. 6 that is similar to FIG. 5. However, the process starts with receiving context associated with at least one neighboring chroma block of a current chroma block as shown in step 610. The context is used in the arithmetic decoding of the first bit of the chroma prediction codes. The remaining steps remain the same as the case in FIG. 5. The above flow charts are intended to illustrate exemplary steps to practice the present invention. A skilled person in the field may rearrange the steps to practice the present invention.

Embodiment of video systems incorporating encoding or decoding of intra chroma prediction mode according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of coding intra chroma prediction mode of a chroma block, the method comprising:
 receiving a set of chroma mode symbols associated with the intra chroma prediction mode of the chroma block, wherein the set of chroma mode symbols includes one entry associated with Luma_mode to allow the chroma block to use an intra luma prediction mode of a corresponding luma block or an selected intra luma prediction mode of several corresponding luma blocks as the intra chroma prediction mode;
 determining variable length codes for the set of chroma mode symbols, wherein a shortest length code is assigned to the Luma_mode;
 receiving a current intra chroma prediction mode for a current chroma block;
 determining a chroma prediction code for the current intra chroma prediction mode of the current chroma block according to the variable length codes; and
 applying intra predictive coding to the current chroma block using the intra luma prediction mode of the corresponding luma block or the selected intra luma prediction mode of several corresponding luma blocks when the Luma_mode is selected for the current intra chroma prediction mode.

2. The method of claim 1, wherein said determining the chroma prediction code for the intra chroma prediction mode of the chroma block is related to Luma_mode, wherein the set of chroma mode symbols includes a plurality of frequent modes, and wherein the variable length codes are modified to reduce a total number of the variable length codes by one and maximum length of variable length codes is decreased by one bit accordingly if Luma_mode is equal to one element of the plurality of frequent modes.

3. The method of claim 2, wherein the plurality of frequent modes may include a DC mode, a Vertical mode, a Horizontal mode and a Diagonal mode, or other possible intra prediction modes.

4. The method of claim 2, wherein the variable length codes are modified by decreasing the maximum length by one bit or more, wherein an order of one codeword among the codewords with a same length is higher as the number of "1" it contains is larger, wherein variable length codes can be extended as a number of chroma prediction modes is increased.

5. The method of claim 1 further comprising a step of receiving context associated with at least one neighboring chroma block of the current chroma block, wherein the context is used in arithmetic coding of a first bit of chroma prediction codes.

6. The method of claim 5, wherein the context associated with said at least one neighboring chroma block is characterized by the intra chroma prediction mode is associated with each of said at least one neighboring chroma block.

7. The method of claim 5, wherein said at least one neighboring chroma block consists of a first neighboring chroma block to a left side of the current chroma block and a second neighboring chroma block to a top side of the current chroma block.

8. The method of claim 7, wherein the context is characterized by a first test and a second test, and selection nodes corresponding to the context consists of combinations of a first result from the first test and a second result from the second test;
wherein the first test determines if a first intra chroma prediction mode associated with the first neighboring chroma block is equal to a first intra luma prediction mode for a first luma block corresponding to the first neighboring chroma block; and
wherein the second test determines if a second intra chroma prediction mode associated with the second neighboring chroma block is equal to a second intra luma prediction mode for a second luma block corresponding to the second neighboring chroma block.

9. A method of decoding intra chroma prediction mode of a chroma block, the method comprising:
receiving variable length codes for a set of chroma mode symbols associated with the intra chroma prediction mode of the chroma block, wherein the set of chroma mode symbols includes one entry associated with Luma_mode to allow the chroma block to use an intra luma prediction mode of a corresponding luma block or an selected intra luma prediction mode of several corresponding luma blocks as the intra chroma prediction mode, and wherein a shortest length code is assigned to the Luma_mode;
receiving data from a compressed bitstream, wherein the compressed bitstream comprises a chroma prediction code corresponding to a current intra chroma prediction mode of a current chroma block;
determining the current intra chroma prediction mode of the current chroma block according to the chroma prediction code and the variable length codes; and
applying intra predictive decoding to the current chroma block using the intra luma prediction mode of the corresponding luma block or the selected intra luma prediction mode of several corresponding luma blocks when the Luma_mode is determined to be the current intra chroma prediction mode.

10. The method of claim 9, wherein the set of chroma mode symbols includes a plurality of frequent modes, and wherein the variable length codes are modified to reduce a total number of the variable length codes by one and maximum length of variable length codes is decreased by one bit accordingly if Luma_mode is equal to one element of the plurality of frequent modes.

11. The method of claim 9, wherein the plurality of frequent modes may include a DC mode, a Vertical mode, a Horizontal mode and a Diagonal mode, or other possible intra prediction modes.

12. The method of claim 10, wherein the variable length codes are modified by decreasing the maximum length by one bit or more, wherein an order of one codeword among the codewords with a same length is higher as the number of "1" it contains is larger, wherein the variable length codes can be extended as a number of chroma prediction modes is increased.

13. The method of claim 9 further comprising a step of receiving context associated with at least one neighboring chroma block of the current chroma block, wherein the context is used in arithmetic coding of a first bit of chroma prediction codes.

14. The method of claim 13, wherein the context associated with said at least one neighboring chroma block is characterized by the intra chroma prediction mode is associated with each of said at least one neighboring chroma block.

15. The method of claim 13, wherein said at least one neighboring chroma block consists of a first neighboring chroma block to a left side of the current chroma block and a second neighboring chroma block to a top side of the current chroma block.

16. The method of claim 15, wherein the context is characterized by a first test and a second test, and wherein selection nodes corresponding to the context consists of combinations of a first result from the first test and a second result from the second test;
wherein the first test determines if a first intra chroma prediction mode associated with the first neighboring chroma block is equal to a first intra luma prediction mode for a first luma block corresponding to the first neighboring chroma block; and
wherein the second test determines if a second intra chroma prediction mode associated with the second neighboring chroma block is equal to a second intra luma prediction mode for a second luma block corresponding to the second neighboring chroma block.

17. An apparatus for coding intra chroma prediction mode of a chroma block, the apparatus comprising:
means for receiving a set of chroma mode symbols associated with the intra chroma prediction mode of the chroma block, wherein the set of chroma mode symbols includes one entry associated with Luma_mode to allow the chroma block to use an intra luma prediction mode of a corresponding luma block or an selected intra luma prediction mode of several corresponding luma blocks as the intra chroma prediction mode;
means for determining variable length codes for the set of chroma mode symbols, wherein a shortest length code is assigned to the Luma_mode;
means for receiving a current intra chroma prediction mode for a current chroma block;
means for determining a chroma prediction code for the current intra chroma prediction mode of the current chroma block according to the variable length codes; and
means for applying intra predictive coding to the current chroma block using the intra luma prediction mode of the corresponding luma block or the selected intra luma prediction mode of several corresponding luma blocks when the Luma_mode is selected for the current intra chroma prediction mode.

18. The apparatus of claim 17, wherein said means for determining the chroma prediction code for the intra chroma prediction mode of the chroma block is related to the intra luma prediction mode of the corresponding luma block, wherein the set of chroma mode symbols includes a plurality of frequent modes, and wherein the variable length codes are modified to reduce a total number of the variable length codes by one and maximum length of variable length codes is decreased by one bit accordingly if Luma_mode is equal one element of the plurality of frequent modes.

19. The apparatus of claim 18, wherein the plurality of frequent modes may include a DC mode, a Vertical mode, a Horizontal mode and a Diagonal mode, or other possible intra prediction modes.

20. The apparatus of claim 18, wherein the variable length codes are modified by decreasing the maximum length by one bit or more, wherein an order of one codeword among the codewords with a same length is higher as the number of "1" it contains is larger, wherein the variable length codes can be extended as a number of chroma prediction modes is increased.

21. The apparatus of claim 17 further comprising means for receiving context associated with at least one neighboring chroma block of the current chroma block, wherein the context is used in arithmetic coding of a first bit of chroma prediction codes.

22. The apparatus of claim 21, wherein the context associated with said at least one neighboring chroma block is characterized by the intra chroma prediction mode is associated with each of said at least one neighboring chroma block.

23. The apparatus of claim 21, wherein said at least one neighboring chroma block consists of a first neighboring chroma block to a left side of the current chroma block and a second neighboring chroma block to a top side of the current chroma block.

24. The apparatus of claim 23, wherein the context is characterized by a first test and a second test, and selection nodes corresponding to the context consists of combinations of a first result from the first test and a second result from the second test;
wherein the first test determines if a first intra chroma prediction mode associated with the first neighboring chroma block is equal to a first intra luma prediction mode for a first luma block corresponding to the first neighboring chroma block; and
wherein the second test determines if a second intra chroma prediction mode associated with the second neighboring chroma block is equal to a second intra luma prediction mode for a second luma block corresponding to the second neighboring chroma block.

25. An apparatus for decoding intra chroma prediction mode of a chroma block, the apparatus comprising:
means for receiving variable length codes for a set of chroma mode symbols associated with the intra chroma prediction mode of the chroma block, wherein the set of chroma mode symbols includes one entry associated with Luma_mode to allow the chroma block to use an intra luma prediction mode of a corresponding luma block or an selected intra luma prediction mode of several corresponding luma blocks as the intra chroma prediction mode, and wherein a shortest length code is assigned to the Luma_mode;
means for receiving data from a compressed bitstream, wherein the compressed bitstream comprises a chroma prediction code corresponding to a current intra chroma prediction mode of a current chroma block;
means for determining the current intra chroma prediction mode of the current chroma block according to the chroma prediction code and the variable length codes; and
means for applying intra predictive decoding to the current chroma block using the intra luma prediction mode of the corresponding luma block or the selected intra luma prediction mode of several corresponding luma blocks when the Luma_mode is determined to be the current intra chroma prediction mode.

26. The apparatus of claim 25, wherein the set of chroma mode symbols includes a plurality of frequent modes, and wherein the variable length codes are modified to reduce a total number of the variable length codes by one and maximum length of variable length codes is decreased by one bit accordingly if Luma_mode is equal to one element of the plurality of frequent modes.

27. The apparatus of claim 26, wherein the plurality of frequent modes may include a DC mode, a Vertical mode, a Horizontal mode and a Diagonal mode.

28. The apparatus of claim 26, wherein the variable length codes are modified by decreasing the maximum length by one bit or more, wherein an order of one codeword among the codewords with a same length is higher as the number of "1" it contains is larger, wherein the variable length codes can be extended as a number of chroma prediction modes is increased.

29. The apparatus of claim 25 further comprising means for receiving context associated with at least one neighboring chroma block of the current chroma block, wherein the context is used in arithmetic coding of a first bit of chroma prediction codes.

30. The apparatus of claim 29, wherein the context associated with said at least one neighboring chroma block is characterized by the intra chroma prediction mode is associated with each of said at least one neighboring chroma block.

31. The apparatus of claim 29, wherein said at least one neighboring chroma block consists of a first neighboring chroma block to a left side of the chroma block and a second neighboring chroma block to a top side of the chroma block.

32. The apparatus of claim 31, wherein the context is characterized by a first test and a second test, and wherein selection nodes corresponding to the context consists of combinations of a first result from the first test and a second result from the second test;
wherein the first test determines if a first intra chroma prediction mode associated with the first neighboring chroma block is equal to a first intra luma prediction mode for a first luma block corresponding to the first neighboring chroma block; and
wherein the second test determines if a second intra chroma prediction mode associated with the second neighboring chroma block is equal to a second intra luma prediction mode for a second luma block corresponding to the second neighboring chroma block.

* * * * *